United States Patent
Newlin et al.

(10) Patent No.: US 10,663,353 B2
(45) Date of Patent: May 26, 2020

(54) CLAMP FOR SENSORS

(71) Applicant: Kidde Technologies, Inc., Wilson, NC (US)

(72) Inventors: Scott Kenneth Newlin, Willow Spring, NC (US); Venkata Satish Babu Lakshmi, Bangalore (IN); Vinod Maruti Naik, Bangalore (IN); Thambiraj Avudaiappan, Bangalore (IN); Steven Wallace, Raleigh, NC (US); Kalyana Chakravarthy, Bangalore (IN); Rhushikesh Patil, Bangalore (IN)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 16/110,215

(22) Filed: Aug. 23, 2018

(65) Prior Publication Data
US 2020/0064202 A1    Feb. 27, 2020

(51) Int. Cl.
| F16B 2/02 | (2006.01) |
| G01K 1/14 | (2006.01) |
| F16B 2/06 | (2006.01) |
| F16M 13/02 | (2006.01) |
| G01K 7/16 | (2006.01) |
| B64D 45/00 | (2006.01) |

(52) U.S. Cl.
CPC ............... G01K 1/14 (2013.01); F16B 2/065 (2013.01); F16M 13/02 (2013.01); B64D 45/00 (2013.01); B64D 2045/009 (2013.01); F16B 2/06 (2013.01); G01K 7/16 (2013.01)

(58) Field of Classification Search
CPC .. G01K 1/14; G01K 7/16; F16B 2/065; F16B 2/02; F16B 2/06; F16M 13/02; B64D 45/00; B64D 2045/009
USPC ....... 248/316.6, 65, 68.1, 72, 73, 74.2, 74.4, 248/74.3
See application file for complete search history.

(56) References Cited

U.S. PATENT DOCUMENTS

| 1,129,782 | A | * | 2/1915 | Bissell ............... H01B 17/24 |
| | | | | 174/155 |
| 2,390,750 | A | * | 12/1945 | Tinnerman .......... F16B 2/005 |
| | | | | 24/535 |
| 2,440,469 | A | | 4/1948 | Goddard |
| 2,791,461 | A | * | 5/1957 | Goldenberg ........... B66C 7/00 |
| | | | | 104/258 |

(Continued)

FOREIGN PATENT DOCUMENTS

| CN | 105627062 A | 6/2016 |
| GB | 2355754 A | 5/2001 |

*Primary Examiner* — Nkeisha Smith
(74) *Attorney, Agent, or Firm* — Kinney & Lange, P.A.

(57) ABSTRACT

A clamp fixture includes a hub extending between a first end and a second end. A first leg extends in a first direction from the first end of the hub, and a second leg extends in the first direction from the second end of the hub. At least a portion of the first leg curves away from the second leg, and at least a portion of the second leg curves away from the first leg. The clamp fixture also includes a loop with a first half and a second half. The first half includes a first jaw extending from the hub. The second half includes a flange and a second jaw extending from the flange. A fastener connects the flange to the hub such that the first jaw and the second jaw join to close the loop.

13 Claims, 2 Drawing Sheets

(56) References Cited

U.S. PATENT DOCUMENTS

| | | | | |
|---|---|---|---|---|
| 3,146,982 A * | 9/1964 | Budnick | F16L 3/237 | 24/135 R |
| 3,526,934 A * | 9/1970 | Owen, Sr. | F16B 7/0433 | 138/106 |
| 3,552,701 A * | 1/1971 | Montagano | B60R 1/12 | 211/85.1 |
| 4,234,999 A * | 11/1980 | Winter | F16B 2/10 | 24/359 |
| 4,805,938 A * | 2/1989 | Redmond | B62B 9/00 | 24/569 |
| 5,443,232 A | 8/1995 | Kesinger et al. | | |
| 5,893,628 A * | 4/1999 | Byers | F21V 3/02 | 362/145 |
| 6,536,982 B2 * | 3/2003 | Gibbons | F16B 7/0433 | 403/391 |
| 6,883,761 B2 * | 4/2005 | Boon | F16L 3/237 | 248/229.24 |
| 6,902,138 B2 * | 6/2005 | Vantouroux | F16L 3/1091 | 248/68.1 |
| 7,007,900 B2 * | 3/2006 | Goodwin | H02G 7/053 | 248/68.1 |
| 7,191,990 B2 | 3/2007 | Hutter, III | | |
| 7,562,855 B2 * | 7/2009 | Oetlinger | F16B 7/0493 | 248/227.4 |
| 7,992,693 B2 * | 8/2011 | Bottger | B60G 21/0551 | 188/321.11 |
| 8,702,044 B2 * | 4/2014 | Railsback | F16L 3/2235 | 248/229.22 |
| 8,708,289 B2 * | 4/2014 | Allenbach | F16L 3/2235 | 248/68.1 |
| 8,770,537 B2 * | 7/2014 | Go | E02F 9/2275 | 212/347 |
| 8,807,491 B2 * | 8/2014 | Armit | E03B 7/095 | 248/68.1 |
| 8,985,531 B2 * | 3/2015 | Wood | B22F 3/1055 | 174/93 |
| 9,038,967 B2 * | 5/2015 | Struck | F16L 3/2235 | 248/68.1 |
| 9,273,804 B2 | 3/2016 | Shinoda | | |
| 9,482,113 B2 | 11/2016 | Graily et al. | | |
| 9,666,978 B2 * | 5/2017 | Fernandez | H01R 13/5804 | |
| 10,012,258 B2 * | 7/2018 | Lambert | F16B 39/00 | |
| 2004/0099772 A1 * | 5/2004 | Durig | B25C 1/18 | 248/68.1 |
| 2008/0048073 A1 * | 2/2008 | Royer | F16L 3/223 | 248/72 |
| 2011/0210215 A1 * | 9/2011 | Nitsche | A61B 5/04085 | 248/74.1 |
| 2013/0112817 A1 * | 5/2013 | Unger | F16L 3/1025 | 248/74.4 |
| 2015/0060612 A1 * | 3/2015 | Blanchard | B64C 1/406 | 248/74.3 |

\* cited by examiner

CLAMP FOR SENSORS

BACKGROUND

The present disclosure relates to fire and overheat detection systems in aircraft and more particularly to sensor mounting fixtures for fire and overheat detection systems.

Conventional fire and overheat detection systems in aircraft engines utilize sensor circuits routed into engine areas that require monitoring for fire or overheat events. A voltage is applied to the sensor circuits and the sensor circuits have a fixed resistance when the engine is operating within proper temperature levels. Should a fire or overheat event occur in the engine, the resistance of the sensor circuit in that location of the engine will decrease in response to the increased temperatures. The decreased resistance in the sensor circuit allows detection of the fire or overheat event.

Mounting fixtures are used to hold the sensor circuits properly in place. Mounting fixtures must be robust enough to withstand the high operating temperatures and high vibration levels present in aircraft engines.

SUMMARY

In one aspect of the invention, a clamp fixture includes a base with a hub, a first leg, and a second leg. The hub extends between a first end and a second end. The first leg extends in a first direction from the first end of the hub, and the second leg extends in the first direction from the second end of the hub. At least a portion of the first leg curves away from the second leg, and at least a portion of the second leg curves away from the first leg. The clamp fixture also includes a loop with a first half and a second half. The first half includes a first flange and a first jaw extending from the first flange. The second half includes a second flange and a second jaw extending from the second flange. A fastener connects the first flange and the second flange to the hub such that the first jaw and the second jaw join to close the loop.

In another aspect of the invention, a clamp fixture includes a hub extending between a first end and a second end. A first leg extends in a first direction from the first end of the hub, and a second leg extends in the first direction from the second end of the hub. At least a portion of the first leg curves away from the second leg, and at least a portion of the second leg curves away from the first leg. The clamp fixture also includes a loop with a first half and a second half. The first half includes a first jaw extending from the hub. The second half includes a flange and a second jaw extending from the flange. A fastener connects the flange to the hub such that the first jaw and the second jaw join to close the loop.

In another aspect of the invention, a clamp assembly includes a hub extending between a first end and a second end. A first leg extends in a first direction from the first end of the hub, and a second leg extends in the first direction from the second end of the hub. A portion of the first leg curves away from the second leg, and a portion of the second leg curves away from the first leg. A rail extends axially between the first leg and the second leg. The portion of the first leg that curves is connected to the rail and extends along a circumference of the rail. The portion of the second leg that curves is also connected to the rail and extends along the circumference of the rail. The clamp assembly includes a loop with a first half with a first jaw extending from the hub, and a second half with a flange and a second jaw extending from the flange. A fastener connects the flange to the hub such that the first jaw and the second jaw join to close the loop.

Persons of ordinary skill in the art will recognize that other aspects and embodiments of the present invention are possible in view of the entirety of the present disclosure, including the accompanying figures.

Figure 1:
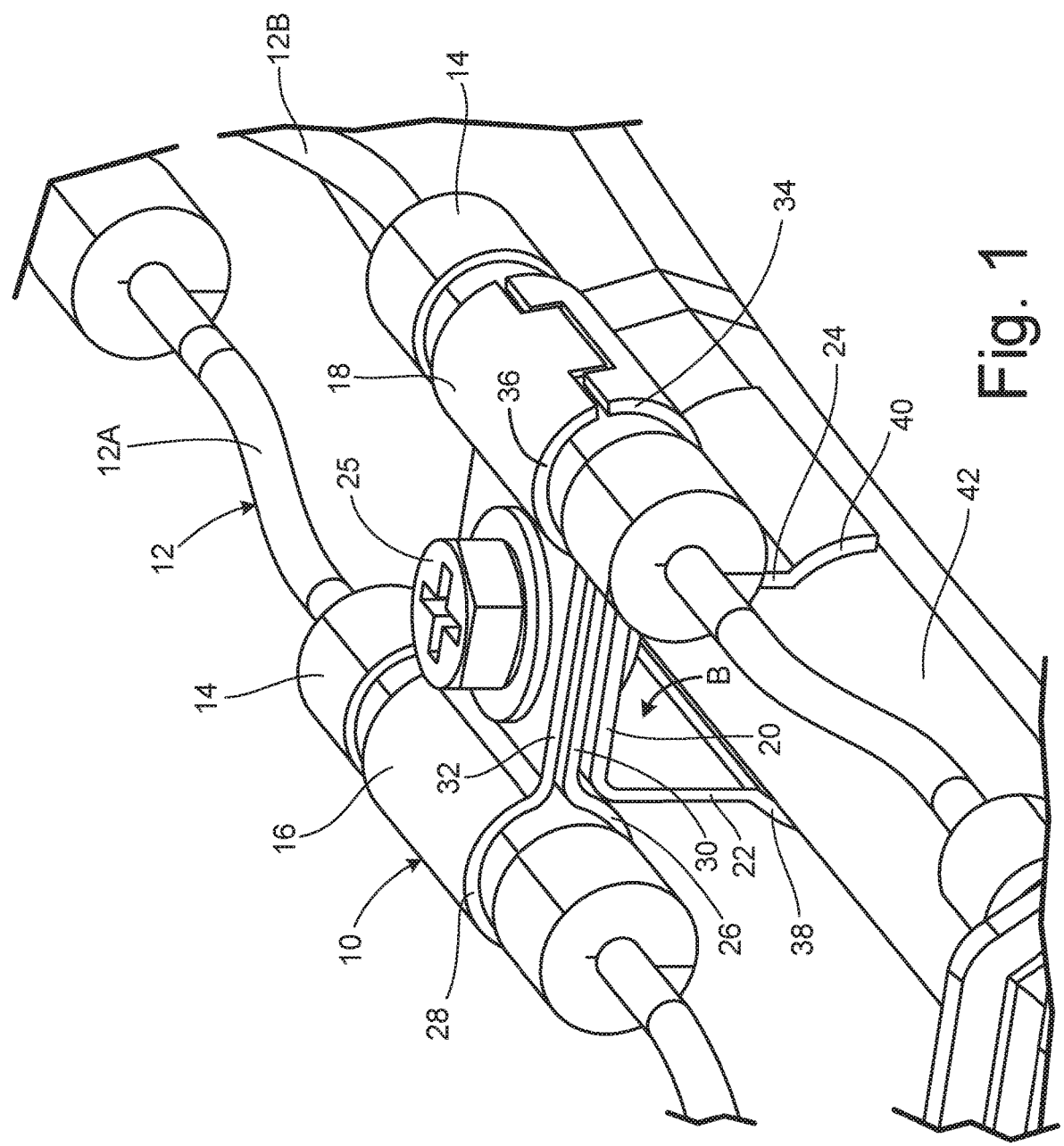
FIG. 1 is a perspective view of a clamp fixture connecting a sensor to a rail.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides a clamp fixture with at least one loop configured to hold a sensor circuit for a fire and overheat detection system in an aircraft engine. The loop is connected to a hub, and two legs extend from the hub. As described below with reference to the Figures, the ends of the legs curve away from each other to accommodate a rail between the legs. The end of each leg is connected to the rail and extends along a circumference of the rail. The curvature of the legs distributes vibrational forces transmitted between the legs and the rail during operation of the aircraft engine, thereby reducing stress concentrations in the clamp fixture.

Figure 2:
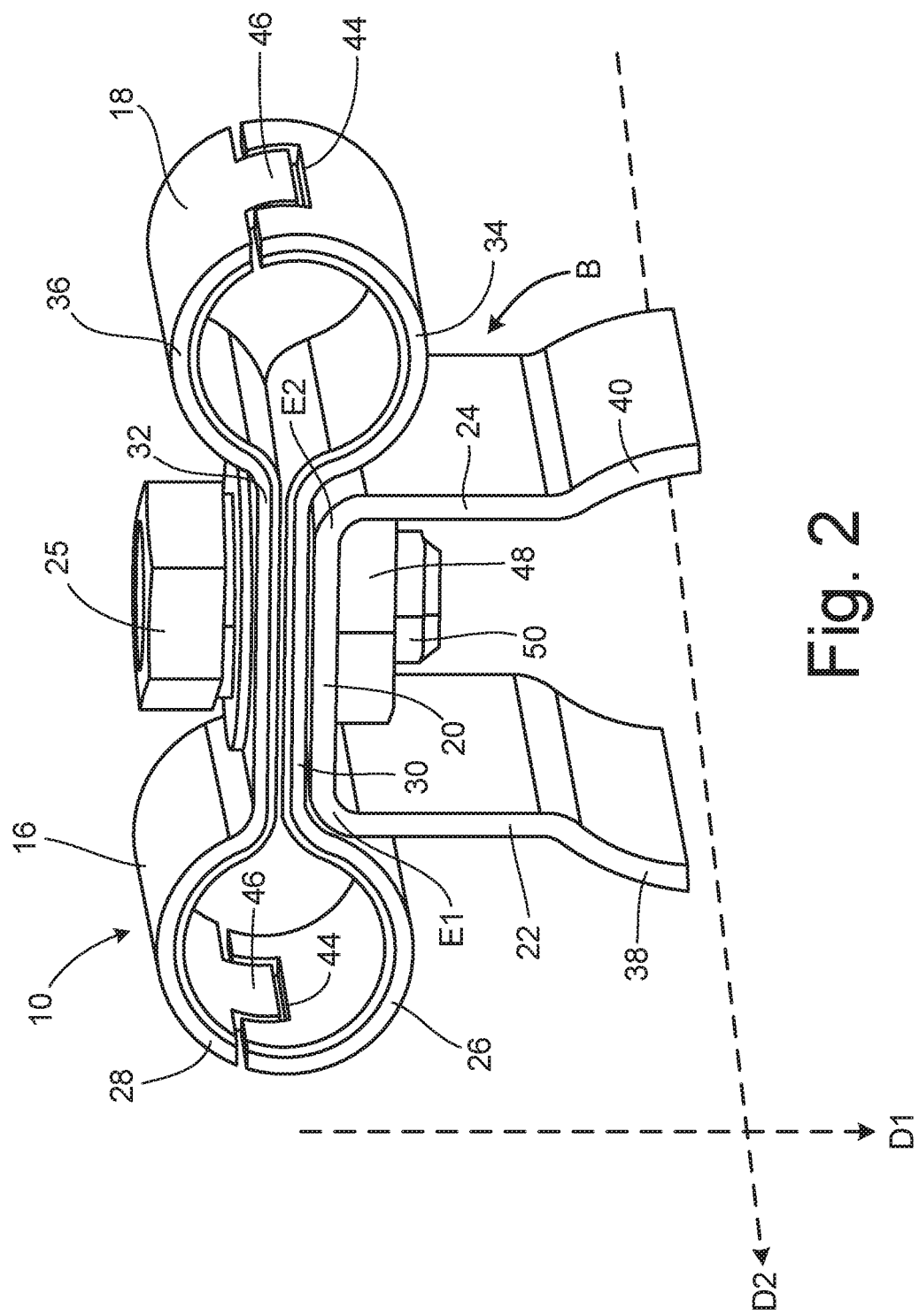
FIG. 2 is a perspective view of the clamp fixture from FIG. 1.

FIGS. 1 and 2 will be discussed concurrently. FIG. 1 is a perspective view of clamp fixture 10, sensor circuit 12, and grommets 14. FIG. 2 is a perspective view of clamp fixture 10 in isolation. As shown in FIGS. 1 and 2, clamp fixture 10 includes first loop 16, second loop 18, hub 20, first leg 22, second leg 24, fastener 25, first jaw 26, second jaw 28, first flange 30, second flange 32, third jaw 34, and fourth jaw 36. First leg 22 includes curved portion 38 and second leg 24 includes curved portion 40. As shown in FIG. 1, camp fixture 10 is connected to rail 42. As shown in FIG. 2, hub 20 includes first end E1 and second end E2. First jaw 26 and third jaw 34 each include anti-rotation slot 44. Second jaw 28 and fourth jaw 36 each include anti-rotation tab 46. Fastener includes nut 48 and bolt 50.

First loop 16 and second loop 18 each receive one of grommets 14. First sensor line 12A of sensor circuit 12 extends through grommet 14 in first loop 16, and second sensor line 12B of sensor circuit 12 extends through grommet 14 in second loop 18. Grommets 14 allow first loop 16 and second loop 18 to grip first sensor line 12A and second sensor line 12B respectively without any rubbing or wear occurring between first loop 16 and second loop 18 and first sensor line 12A and second sensor line 12B respectively. Sensor circuit 12 can be a linear fire and overheat detector. First and second loops 16, 18 connect sensor circuit 12 to hub 20, and first leg 22 and second leg 24 connect hub 20 to rail 42.

Together, hub 20, first leg 22, and second leg 24 form a base B of clamp fixture 10. Hub 20 extends between first end E1 and second end E2. First leg 22 extends in a first direction D1 from first end E1 of hub 20, and second leg 24 extends in the first direction D1 from second end E2 of hub 20. Hub 20, first leg 22, and second leg 24 can be formed from a single flat metal sheet bent into shape, giving each of hub 20, first leg 22, and second leg 24 a flat profile and width extending in a second direction D2. A distal end of first leg 22 is bent to form curved portion 38, and a distal end of second leg 24 is bent to form curved portion 38. Curved portion 38 of first leg 22 curves away from second leg 24, and curved portion 40 of second leg 24 curves away from first leg 22. Rail 42 extends axially in the second direction D2 between curved portion 38 of first leg 22 and curved portion 40 of second leg 24. Rail 42 connects clamp fixture 10 to an aircraft engine (not shown). In the embodiment of FIG. 1, rail 42 is cylindrical and curved portions 38, 40 are shaped to correspond with and extend along part of the outer circumference of rail 42. Curved portions 38, 40 are connected to rail 42 by welding or brazing. The curvature of curved portions 38, 40 and axial extent/width of curved portions 38, 40 distributes vibrational forces transmitted between rail 42 and first and second legs 22, 24 during operation of an aircraft engine incorporating clamp fixture 10. Distributing the vibrational forces transmitted between rail 42 and first and second legs 22, 24 reduces stress concentrations from arising in clamp fixture 10, allowing clamp fixture 10 to remain connected to rail 42 in high-vibration environments.

As shown best in FIG. 2, first jaw 26, first flange 30, and third jaw 34 are formed from a single flat metal sheet bent into shape, giving each of first jaw 26, first flange 30, and third jaw 34 a width extending in a second direction D2. First flange 30 is positioned between first jaw 26 and third jaw 34. Together, first jaw 26, first flange 30, and third jaw 34 form a first half of first loop 16 and second loop 18. Second jaw 28, second flange 32, and fourth jaw 36 are also formed from a single flat metal sheet bent into shape, giving each of second jaw 28, second flange 32, and fourth jaw 36 a width extending in a second direction D2. Second flange 32 is positioned between second jaw 28 and fourth jaw 36. Together, second jaw 28, second flange 32, and fourth jaw 36 form a second half of first loop 16 and second loop 18. First jaw 26, second jaw 28, first flange 30, second flange 32, third jaw 34, and fourth jaw 36 can all be formed from the same material with the same gauge and uniform width as hub 20, first leg 22, and second leg 24.

First flange 30 is connected to hub 20 such that first jaw 26 extends off of hub 20 past first leg 22, and third jaw 34 extends off of hub 20 past second leg 24. In the embodiment of FIGS. 1 and 2, first flange 30, first jaw 26, and third jaw 34 are welded, brazed, or press fit to hub 20 to prevent rotation of first flange 30, first jaw 26, and third jaw 34 relative hub 20. Second flange 32 is positioned over first flange 30 such that second jaw 28 extends over first jaw 26 and joins with first jaw 26 to close first loop 16, and fourth jaw 36 extends over third jaw 34 and joins with third jaw 34 to close second loop 18.

Fastener 25 connects second flange 32 to first flange 30 and hub 20. In alternate embodiments, fastener 25 can connect both first flange 30 and second flange 32 to hub 20 instead of welding first flange 30 to hub 20. As best shown in FIG. 2, fastener 25 includes nut 48 and bolt 50. Bolt 50 extends through second flange 32, first flange 30, and hub 20, and nut 48 is threaded onto bolt 50. Nut 48 can be welded to hub 20 opposite first flange 30 to prevent rotation of nut 48 when bolt 50 is threaded into nut 48. Anti-rotation slots 44 are formed on first jaw 26 and third jaw 34, and anti-rotation tabs 46 are formed on second jaw 28 and fourth jaw 36. Anti-rotation tabs 46 mate with anti-rotation slots 44 to prevent rotation of second jaw 28 and fourth jaw 36 relative first jaw 26 and third jaw 34 respectively when bolt 50 is turned and threaded into nut 48.

In view of the foregoing description, it will be recognized that the present disclosure provides numerous advantages and benefits. For example, the present disclosure provides clamp fixture 10 with curved portions 38, 40 on first and second legs 22, 24 respectively. As previously discussed above, curved portions 38, 40 are connected to rail 42 by welding or brazing, or by tack welding and brazing. The curvature of curved portions 38, 40 distributes vibrational forces transmitted between rail 42 and first and second legs 22, 24 during operation of an aircraft engine incorporating clamp fixture 10. Distributing the vibrational forces transmitted between rail 42 and first and second legs 22, 24 reduces stress concentrations from arising in clamp fixture 10, allowing clamp fixture 10 to remain connected to rail 42 in high-vibration environments, thereby maintaining sensor circuit 12 in the correct position.

The following are non-exclusive descriptions of possible embodiments of the present invention.

In one embodiment, a clamp fixture includes a base with a hub, a first leg, and a second leg. The hub extends between a first end and a second end. The first leg extends in a first direction from the first end of the hub, and the second leg extends in the first direction from the second end of the hub. At least a portion of the first leg curves away from the second leg, and at least a portion of the second leg curves away from the first leg. The clamp fixture also includes a loop with a first half and a second half. The first half includes a first flange and a first jaw extending from the first flange. The second half includes a second flange and a second jaw extending from the second flange. A fastener connects the first flange and the second flange to the hub such that the first jaw and the second jaw join to close the loop.

The clamp fixture of the preceding paragraph can optionally include, additionally and/or alternatively, any one or more of the following features, configurations and/or additional components:

a second loop comprising: a third jaw extending from the first flange opposite the first jaw; and a fourth jaw extending from the second flange opposite the second jaw, wherein the third jaw and the fourth jaw join to close the second loop when the first flange and the second flange are connected to the hub by the fastener;

the fastener comprises: a bolt extending through the first flange, the second flange, and the hub; and a nut on the hub opposite the first flange and the second flange;

the nut is welded, brazed, or press fit to the hub;

the first flange is welded, brazed, or press fit to the hub;

the hub, the first leg, the second leg, the first flange, and the second flange have a uniform width in a second direction;

a rail extending in a second direction between the first leg and the second leg, wherein the portion of the first leg that curves is connected to the rail and extends along a circumference of the rail, and wherein the portion of the second leg that curves is connected to the rail and extends along the circumference of the rail;

the portion of the first leg that curves is welded, brazed, or press fit to the rail, and the portion of the second leg that curves is welded, brazed, or press fit to the rail; and/or the first jaw comprises an anti-rotation slot, and the second jaw comprises an anti-rotation tab that mates with the anti-rotation slot.

In another embodiment, a clamp fixture includes a hub extending between a first end and a second end. A first leg extends in a first direction from the first end of the hub, and a second leg extends in the first direction from the second end of the hub. At least a portion of the first leg curves away from the second leg, and at least a portion of the second leg curves away from the first leg. The clamp fixture also includes a loop with a first half and a second half. The first half includes a first jaw extending from the hub. The second half includes a flange and a second jaw extending from the flange. A fastener connects the flange to the hub such that the first jaw and the second jaw join to close the loop.

The clamp fixture of the preceding paragraph can optionally include, additionally and/or alternatively, any one or more of the following features, configurations and/or additional components:

a second loop comprising: a third jaw extending from the hub opposite the first jaw; and a fourth jaw extending from the flange opposite the second jaw, wherein the third jaw and the fourth jaw join to close the second loop when the flange is connected to the hub by the fastener;

the fastener comprises: a bolt extending through the flange and the hub; and a nut on the hub opposite the flange;

the nut is welded, brazed, or press fit to the hub, and wherein the first jaw is welded, brazed, or press fit to the hub;

a rail extending in a second direction between the first leg and the second leg, wherein the portion of the first leg that curves is connected to the rail and extends along a circumference of the rail, and wherein the portion of the second leg that curves is connected to the rail and extends along the circumference of the rail; and/or the portion of the first leg that curves is welded, brazed, or press fit to the rail, and the portion of the second leg that curves is welded, brazed, or press fit to the rail.

In another embodiment, a clamp assembly includes a hub extending between a first end and a second end. A first leg extends in a first direction from the first end of the hub, and a second leg extends in the first direction from the second end of the hub. A portion of the first leg curves away from the second leg, and a portion of the second leg curves away from the first leg. A rail extends axially between the first leg and the second leg. The portion of the first leg that curves is connected to the rail and extends along a circumference of the rail. The portion of the second leg that curves is also connected to the rail and extends along the circumference of the rail. The clamp assembly includes a loop with a first half with a first jaw extending from the hub, and a second half with a flange and a second jaw extending from the flange. A fastener connects the flange to the hub such that the first jaw and the second jaw join to close the loop.

The clamp assembly of the preceding paragraph can optionally include, additionally and/or alternatively, any one or more of the following features, configurations and/or additional components:

a second loop comprising: a third jaw extending from the hub opposite the first jaw; and a fourth jaw extending from the flange opposite the second jaw, wherein the third jaw and the fourth jaw join when the flange is connected to the hub by the fastener;

the fastener comprises: a bolt extending through the flange and the hub; and a nut on the hub opposite the flange;

the nut is welded, brazed, or press fit to the hub, and wherein the first and third jaw are welded, brazed, or press fit to the hub; and/or the portion of the first leg that curves is welded, brazed, or press fit to the rail, and the portion of the second leg that curves is welded, brazed, or press fit to the rail.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 1 and 2 show first loop 16 and second loop 18 connected to hub 20 via first flange 30 and second flange 32, first loop 16 and second loop 18 can be connected directly to hub 20. In addition, many modifications may be made to adapt a particular situation or material to the teachings of the invention without departing from the essential scope thereof. For example, while FIGS. 1 and 2 show clamp fixture 10 with two loops (first loop 16 and second loop 18), some embodiments clamp fixture 10 can have a single loop. Therefore, it is intended that the invention not be limited to the particular embodiment(s) disclosed, but that the invention will include all embodiments falling within the scope of the appended claims.

The invention claimed is:

1. A clamp fixture comprising:
a base comprising:
a hub extending between a first end and a second end;
a first leg extending in a first direction from the first end of the hub; and
a second leg extending in the first direction from the second end of the hub,
wherein at least a portion of the first leg curves away from the second leg, and at least a portion of the second leg curves away from the first leg;
a loop comprising:
a first half with a first flange and a first jaw extending from the first flange; and
a second half with a second flange and a second jaw extending from the second flange, wherein the hub, the first leg, the second leg, the first flange, and the second flange have a uniform width in a second direction; and
a fastener connecting the first flange and the second flange to the hub such that the first jaw and the second jaw join to close the loop, the fastener comprising:
a bolt extending through the first flange, the second flange, and the hub, wherein the bolt does not extend to the curved portions of the first and second legs; and a nut on the hub opposite the first flange and the second flange, wherein the nut is welded, brazed, or press fit to the hub, so as to be immovable with respect thereto.

2. The clamp fixture of claim 1 further comprising:
a second loop comprising:
   a third jaw extending from the first flange opposite the first jaw; and
   a fourth jaw extending from the second flange opposite the second jaw,
   wherein the third jaw and the fourth jaw join to close the second loop when the first flange and the second flange are connected to the hub by the fastener.

3. The clamp fixture of claim 1, wherein the first flange is welded, brazed, or press fit to the hub.

4. The clamp fixture of claim 1, further comprising:
a rail extending in a second direction between the first leg and the second leg, wherein the portion of the first leg that curves is connected to the rail and extends along a circumference of the rail, and wherein the portion of the second leg that curves is connected to the rail and extends along the circumference of the rail.

5. The clamp fixture of claim 4, wherein the portion of the first leg that curves is welded, brazed, or press fit to the rail, and the portion of the second leg that curves is welded, brazed, or press fit to the rail.

6. The clamp fixture of claim 1, wherein the first jaw comprises an anti-rotation slot, and the second jaw comprises an anti-rotation tab that mates with the anti-rotation slot.

7. A clamp fixture comprising:
a hub extending between a first end and a second end;
a first leg extending in a first direction from the first end of the hub;
a second leg extending in the first direction from the second end of the hub, wherein at least a portion of the first leg curves away from the second leg, and at least a portion of the second leg curves away from the first leg;
a loop comprising:
   a first half with a first jaw extending from the hub, wherein the first jaw is welded, brazed or press fit to the hub; and
   a second half with a flange and a second jaw extending from the flange;
a fastener connecting the flange to the hub such that the first jaw and the second jaw join to close the loop, the fastener comprising:
   a bolt extending through the flange and the hub, wherein the bolt does not extend to the curved portions of the first and second legs; and
   a nut on the hub opposite the flange,
   wherein the nut is welded, brazed, or press fit to the hub, so as to be immovable with respect thereto; and
a second loop comprising:
   a third jaw extending from the hub opposite the first jaw; and
   a fourth jaw extending from the flange opposite the second jaw,
   wherein the third jaw and the fourth jaw join to close the second loop when the flange is connected to the hub by the fastener.

8. The clamp fixture of claim 7, further comprising:
a rail extending in a second direction between the first leg and the second leg, wherein the portion of the first leg that curves is connected to the rail and extends along a circumference of the rail, and wherein the portion of the second leg that curves is connected to the rail and extends along the circumference of the rail.

9. The clamp fixture of claim 8, wherein the portion of the first leg that curves is welded, brazed, or press fit to the rail, and the portion of the second leg that curves is welded, brazed, or press fit to the rail.

10. A clamp assembly comprising:
a hub extending between a first end and a second end;
a first leg extending in a first direction from the first end of the hub;
a second leg extending in the first direction from the second end of the hub, wherein a portion of the first leg curves away from the second leg, and a portion of the second leg curves away from the first leg;
a rail extending axially between the first leg and the second leg, wherein the portion of the first leg that curves is connected to the rail and extends along a circumference of the rail, and wherein the portion of the second leg that curves is connected to the rail and extends along the circumference of the rail;
a loop comprising:
   a first half with a first jaw extending from the hub; and
   a second half with a flange and a second jaw extending from the flange; and
a fastener connecting the flange to the hub such that the first jaw and the second jaw join to close the loop, the fastener comprising:
   a bolt extending through the flange and the hub, wherein the bolt does not directly abut the rail; and
   a nut on the hub opposite the flange, wherein the nut is welded, brazed, or press fit to the hub, so as to be immovable with respect thereto.

11. The clamp assembly of claim 10 further comprising:
a second loop comprising:
   a third jaw extending from the hub opposite the first jaw; and
   a fourth jaw extending from the flange opposite the second jaw,
   wherein the third jaw and the fourth jaw join when the flange is connected to the hub by the fastener.

12. The clamp assembly of claim 11, wherein the first and third jaws are welded, brazed, or press fit to the hub.

13. The clamp assembly of claim 11, wherein the portion of the first leg that curves is welded, brazed, or press fit to the rail, and the portion of the second leg that curves is welded, brazed, or press fit to the rail.

* * * * *